US 11,805,234 B2

(12) United States Patent
Noguchi et al.

(10) Patent No.: US 11,805,234 B2
(45) Date of Patent: Oct. 31, 2023

(54) STEREO CAMERA DEVICE

(71) Applicants: Shinji Noguchi, Kanagawa (JP); Tomonori Aoki, Kanagawa (JP)

(72) Inventors: Shinji Noguchi, Kanagawa (JP); Tomonori Aoki, Kanagawa (JP)

(73) Assignee: RICOH INDUSTRIAL SOLUTIONS INC., Kanagawa (JP)

( * ) Notice: Subject to any disclaimer, the term of this patent is extended or adjusted under 35 U.S.C. 154(b) by 0 days.

(21) Appl. No.: 17/654,862

(22) Filed: Mar. 15, 2022

(65) Prior Publication Data

US 2022/0303521 A1     Sep. 22, 2022

(30) Foreign Application Priority Data

Mar. 22, 2021 (JP) .................. 2021-047465

(51) Int. Cl.
*H04N 13/239* (2018.01)
*H04N 13/246* (2018.01)
*G06T 7/521* (2017.01)
*G06T 7/80* (2017.01)

(52) U.S. Cl.
CPC ........... *H04N 13/239* (2018.05); *G06T 7/521* (2017.01); *G06T 7/85* (2017.01); *H04N 13/246* (2018.05); *G06T 2207/10012* (2013.01); *G06T 2207/10028* (2013.01)

(58) Field of Classification Search
CPC .. H04N 13/239; H04N 13/246; H04N 13/254; H04N 13/271; H04N 13/243; G06T 7/521; G06T 7/85; G06T 2207/10012; G06T 2207/10028; G01S 7/4813; G01S 7/497; G01S 17/08; G01S 17/48; G01S 17/86; G01S 17/89

USPC ........................................................ 348/47
See application file for complete search history.

(56) References Cited

U.S. PATENT DOCUMENTS

| 2015/0002638 | A1 | 1/2015 | Suzuki et al. |
| 2016/0227193 | A1* | 8/2016 | Osterwood ............ G01S 17/42 |
| 2016/0349371 | A1 | 12/2016 | Suzuki et al. |
| 2016/0375828 | A1* | 12/2016 | Yun ........................ B60S 1/54 |
| | | | 701/48 |
| 2019/0391244 | A1* | 12/2019 | Sekiguchi ............. G01S 17/42 |
| 2020/0018854 | A1* | 1/2020 | Hicks .................. G02B 26/105 |
| 2020/0211219 | A1* | 7/2020 | Yamazaki .............. G01S 17/87 |

(Continued)

FOREIGN PATENT DOCUMENTS

| EP | 3358369 | 8/2018 |
| EP | 3674747 | 7/2020 |

(Continued)

OTHER PUBLICATIONS

Extended European Search Report for 22162580.9 dated Aug. 17, 2022.

*Primary Examiner* — Susan E. Torgerson
(74) *Attorney, Agent, or Firm* — IPUSA, PLLC (57) ABSTRACT

A stereo camera device includes a plurality of cameras, a distance sensor configured to detect a distance to an object, a holder configured to hold the plurality of cameras and the distance sensor so that the optical axis of the distance sensor and the optical axes of the plurality of cameras are in the same direction, an electronic circuit, and a case in which the plurality of cameras and the distance sensor held by the holder, and the electronic circuit are provided.

8 Claims, 8 Drawing Sheets

(56) References Cited

U.S. PATENT DOCUMENTS

| | | | | |
|---|---|---|---|---|
| 2020/0310069 | A1* | 10/2020 | Takeuchi | ............... G03B 17/02 |
| 2021/0123778 | A1* | 4/2021 | Chun | .................... G01S 13/867 |
| 2021/0293942 | A1 | 9/2021 | Kawasaki et al. | |
| 2022/0097601 | A1* | 3/2022 | Harada | ................... B60Q 3/74 |

FOREIGN PATENT DOCUMENTS

| | | |
|---|---|---|
| JP | H11-325890 | 11/1999 |
| JP | 2012-167944 | 9/2012 |
| JP | 2012-189324 | 10/2012 |
| JP | 6427984 | 11/2018 |
| JP | 6528447 | 6/2019 |
| JP | 2021-148643 | 9/2021 |
| WO | 2019/029551 | 2/2019 |

* cited by examiner

STEREO CAMERA DEVICE

CROSS-REFERENCE TO RELATED APPLICATIONS

This application is based upon and claims priority to earlier Japanese Patent Application No. 2021-047465 filed on Mar. 22, 2021, the entirety of which is incorporated herein by reference.

FIELD

The present invention relates to a stereo camera device.

BACKGROUND

In recent years, various safety devices have been installed in vehicles in the field of automobiles and industrial machinery such as forklifts and hydraulic excavators, for the purpose of avoiding undesirable accidents due to drivers' carelessness. One of the safety measures being promoted is installation of an external sensor which can detect surrounding objects. Examples of the external sensor include stereo cameras and millimeter-wave radars. Using such a safety device, accidents associated with vehicle collisions can be avoided by alerting the driver or controlling the travelling state of the vehicle, depending on the detected situations, upon detecting an object or a worker around the vehicle.

A stereo camera determines a distance using parallax information of the images acquired by two cameras, and therefore, the detection range of a stereo camera is shorter than that of a monocular camera. However, an object can be accurately detected in the short range. In distance measurement using a stereo camera, it is required that the optical axes of the two cameras are parallel in principle. For a stereo camera mounted on a vehicle, it is difficult to strictly maintain the parallel condition of the optical axes because of changes in the lens posture over time due to temperature change, vibrations, mechanical tolerances of the housing, etc.

A stereo camera having a camera stay for integrally coupling a set of monocular cameras so that the optical axes of the monocular cameras are in the same direction is proposed. See, for example, JP 2012-189324 A. This stereo camera also has image correction means that corrects an image taken from each of the monocular cameras, and distance determination means that determines a parallax from the image corrected by the image correction means to calculate the distance to a subject to be taken. A method of calibrating camera parameters by setting a calibration target in front of the stereo camera, while setting a laser rangefinder behind the stereo camera, is also known. See, for example, JP 2012-167944 A. This calibration method uses the distance L1 from the laser rangefinder to the reference plane of the camera stay, and the distance L2 from the laser rangefinder to the calibration target. There is another known technique for reproducing an original image by estimating a positional deviation of the lens based on the distortion of the image taken by a stereo camera, and correcting the distortion by electronically deforming the image through image correction processing. See, for example, JP H11-325890 A.

The wider the angle of the camera, the more complicated the image distortion that occurs and the amount of correction increases. With only geometric correction using polynomial approximation, it is difficult to achieve satisfactory distortion correction, and a mechanical structure that can stably maintain the positional and postural relations between cameras is required. In a severe environment, like a construction site, exposed to harsh conditions such as temperature changes, vibrations, collisions, or the like, the positional and postural relations between cameras tend to fluctuate over time, and the distance calculated from the parallax tends to deviate from the actually measured distance. If such deviation is non-linear, it is difficult to predict in advance, and distance measurement accuracy may deteriorate.

A stereo camera which can stably maintain the postural relation between a camera and a distance sensor is demanded.

SUMMARY

In an embodiment, a stereo camera device includes a plurality of cameras, a distance sensor configured to detect a distance to an object, and a holder configured to hold the plurality of cameras and the distance sensor so that the optical axis of the distance sensor and the optical axes of the plurality of cameras are in the same direction. The stereo camera device also includes an electronic circuit, and a case in which the plurality of cameras and the distance sensor held by the holder, and the electronic circuit are provided.

DETAILED DESCRIPTION

Figure 1:
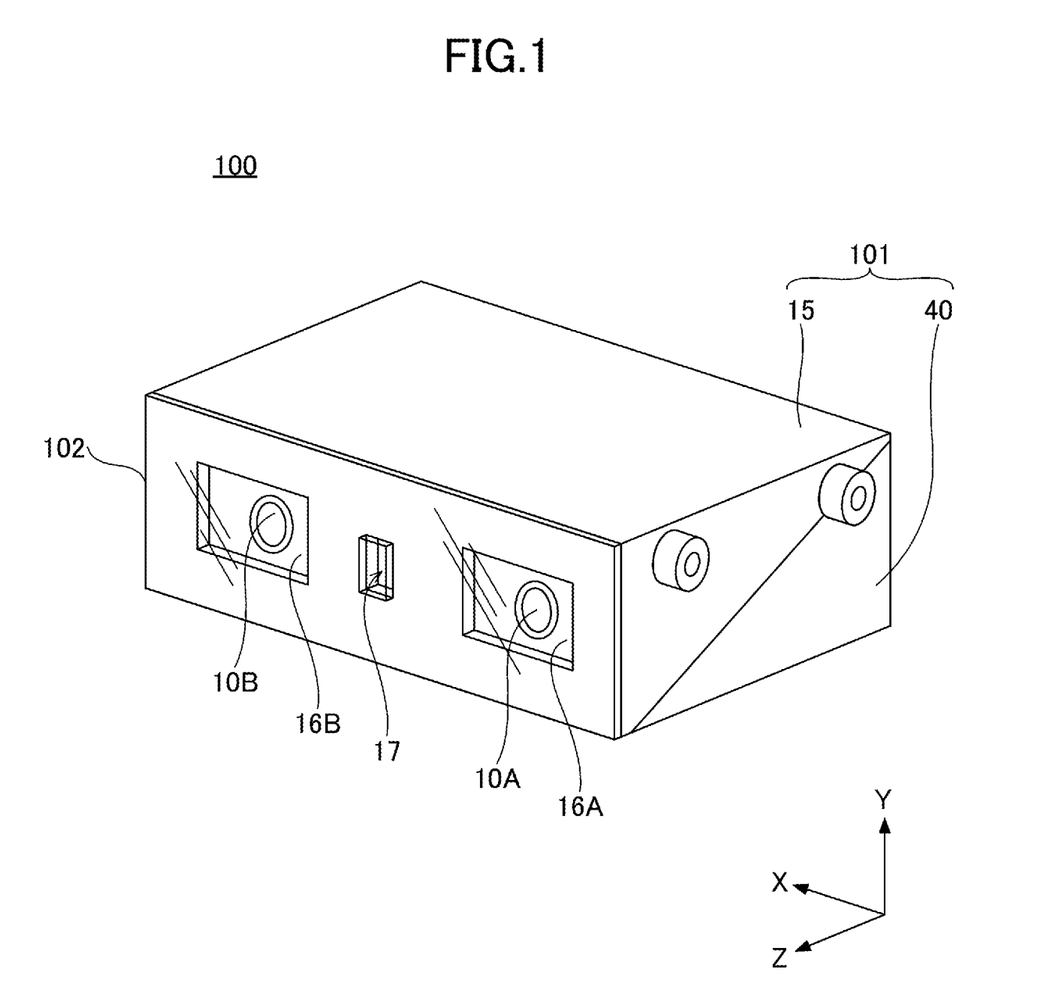
FIG. 1 is an external view of a stereo camera device according to an embodiment.
Figure 2A:
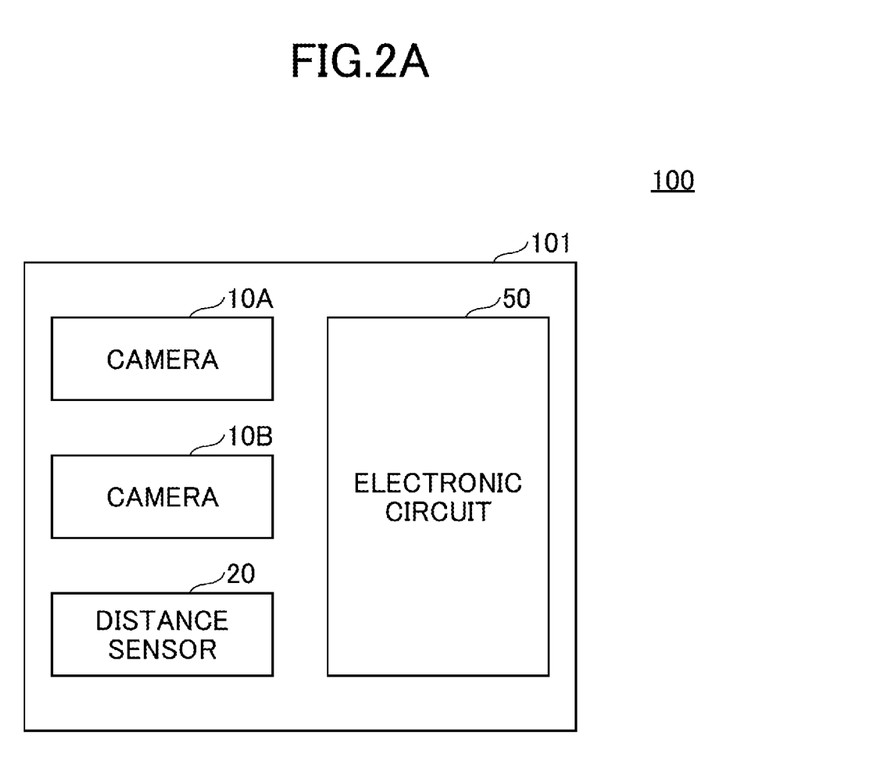
FIG. 2A shows a hardware configuration of the stereo camera device of FIG. 1.

FIG. 1 is an external view of a stereo camera device 100 according to an embodiment, and FIG. 2A shows a hardware configuration of the stereo camera device 100. As shown in FIG. 1 and FIG. 2A, the stereo camera device 100 includes cameras 10A and 10B, a distance sensor 20, an electronic circuit 50, and a housing case 101 that houses the above-described optical components and the electronic circuit 50. The housing case 101 is just an example of a case. Although two cameras 10A and 10B are used in this example, distance measurement or ranging may be carried out using three or more cameras.

Figure 7:
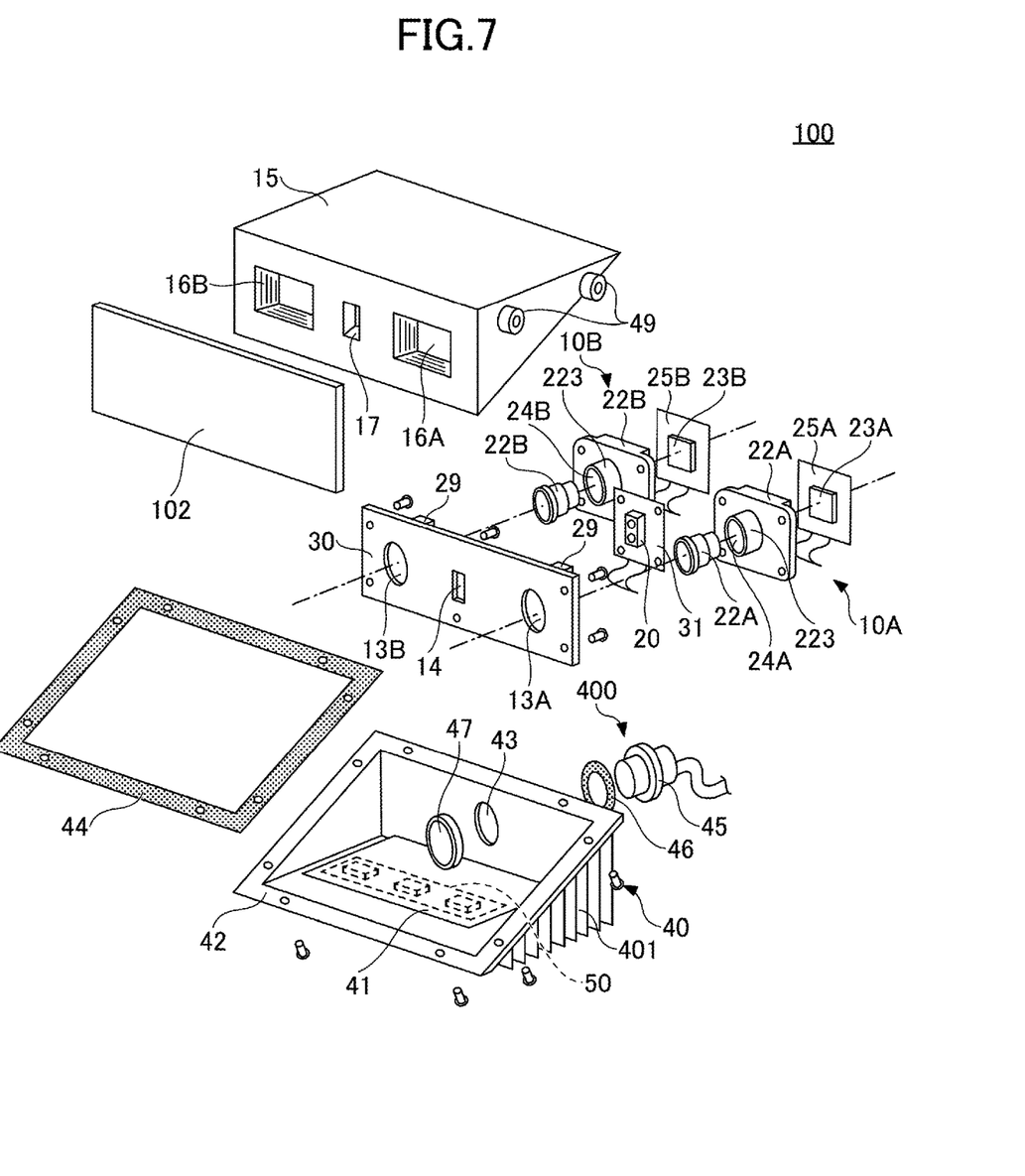
FIG. 7 is an exploded perspective view of the stereo camera device.
Figure 8A:
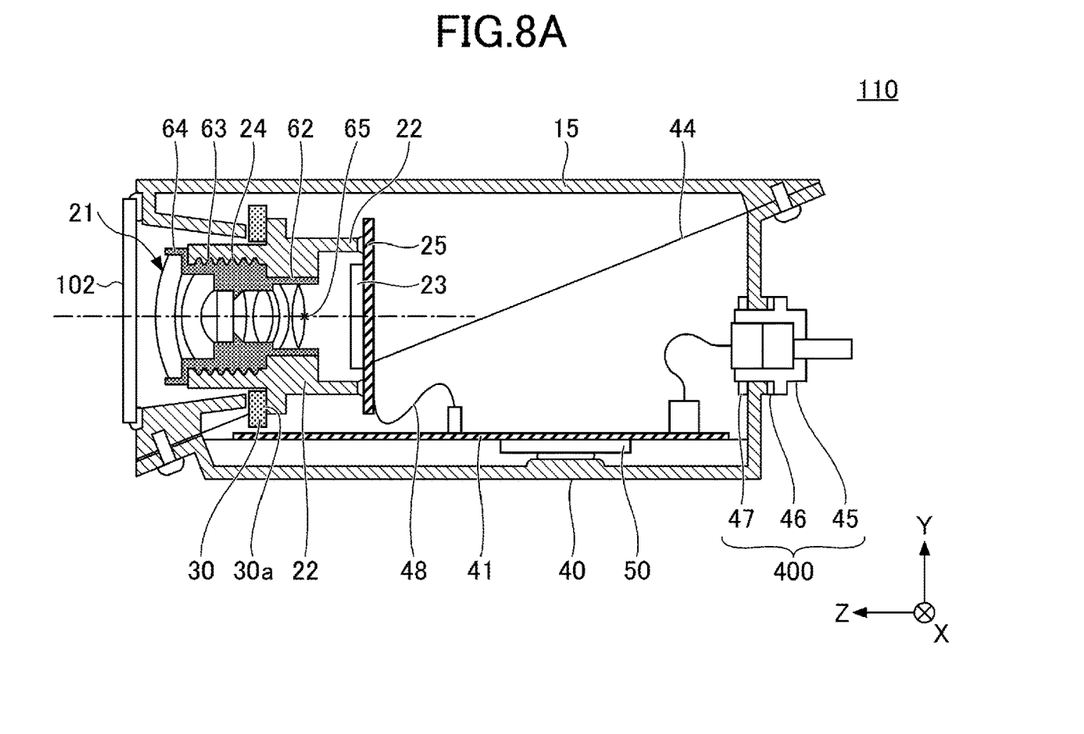
FIG. 8A is a vertical cross-sectional view of the stereo camera device.
Figure 8B:
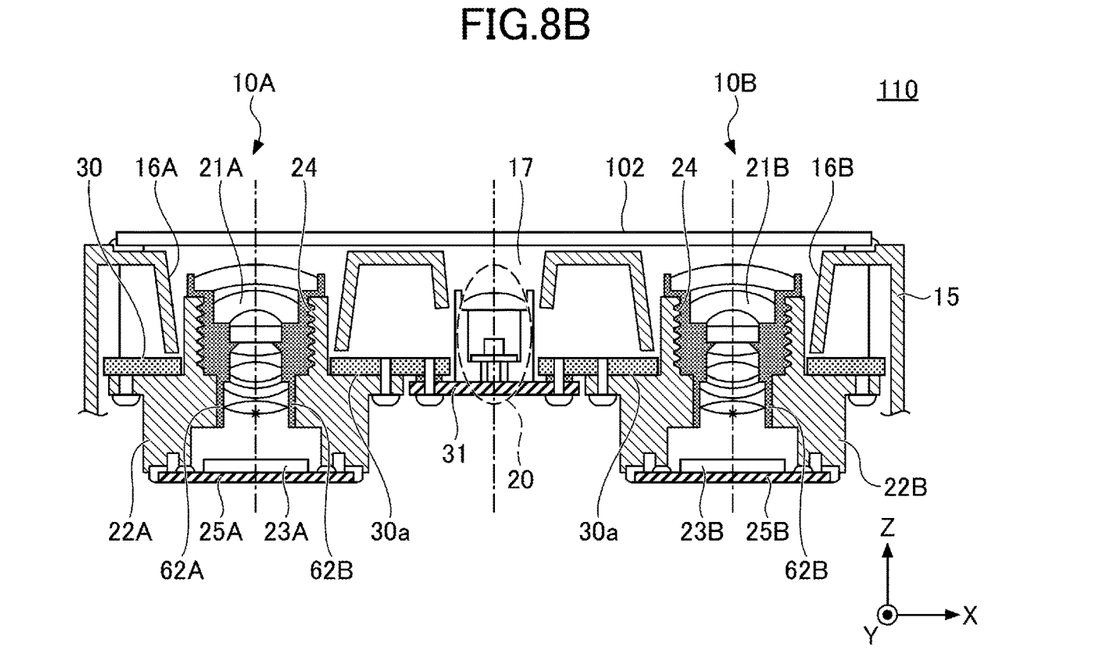
FIG. 8B is a horizontal cross-sectional view of the stereo camera device.

In FIG. 1, the direction in which the cameras 10A and 10B are arrayed side by side is the X direction, the direction of the optical axis of the stereo camera device 100 is the Z direction, and the direction orthogonal to both the X direction and the Z direction is the Y direction. The cameras 10A and 10B and the distance sensor 20 are held by a holder 30 in a predetermined positional relationship (as illustrated in FIG. 7, FIG. 8A, and FIG. 8B) inside the housing case 101, as will be described later. The housing case 101 serves as a protector for protecting the optical components and the electronic circuit 50. By providing the cameras 10A and 10B and the distance sensor 20 inside the housing case 101, environmental resistance including a robustness against colliding objects, dust resistance against dust and dirt, and waterproofness against rain and snow can be ensured. The housing case 101 does not have to be hermetically sealed as long as the internal components including the optical components and the electronic circuits can be protected from the external environment. In one embodiment, the cameras 10A and 10B and the distance sensor 20 are integrally held by a holder 30 (see FIG. 7, FIG. 8A, and FIG. 8B) in the housing case 101 in a predetermined positional relationship such that the positioning accuracy is maintained.

The housing case 101 is, for example, a metal or alloy case formed by die casting or the like. In the example of FIG. 1, the housing case 101 is made of die-cast aluminum. The housing case 101 is configured with an upper case 15 and a lower case 40, which can be separated diagonally with respect to the bottom of the case, whereby maintenance, repair, and replacement of parts or components housed inside the housing case 101 can be facilitated.

The housing case 101 has openings 16A and 16B which enable the cameras 10A and 10B to capture images, and an opening 17 which enables the distance sensor 20 to perform distance measurement. The housing case 101 has a cover glass 102 provided onto the front face of the housing case and serving as a light transmitting member. The cover glass 102 covers the openings 16A, 16B, and 17, so that the housing case 101 is closed, while maintaining light transmission. The cover glass 102 is preferably a single glass plate so that occurrence of optical errors due to differences in thickness or warp among the openings 16A, 16B, and 17 is prevented.

The electronic circuit 50 performs image processing and distance calculation, based on the image data (captured image) of the object to be measured acquired by the cameras 10A and 10B, to determine the distance to the object.

Meanwhile, the distance sensor 20 receives a light beam reflected from the object to be measured, and measures the distance to the object in order to calibrate or correct the distance estimated from the imaging data. The distance sensor 20 is, for example, a time-of-flight (ToF) sensor that determines the distance to the object based on the time taken from emission of the light beam (or electromagnetic wave) toward the object to reception of the light beam reflected from the object.

Figure 2B:
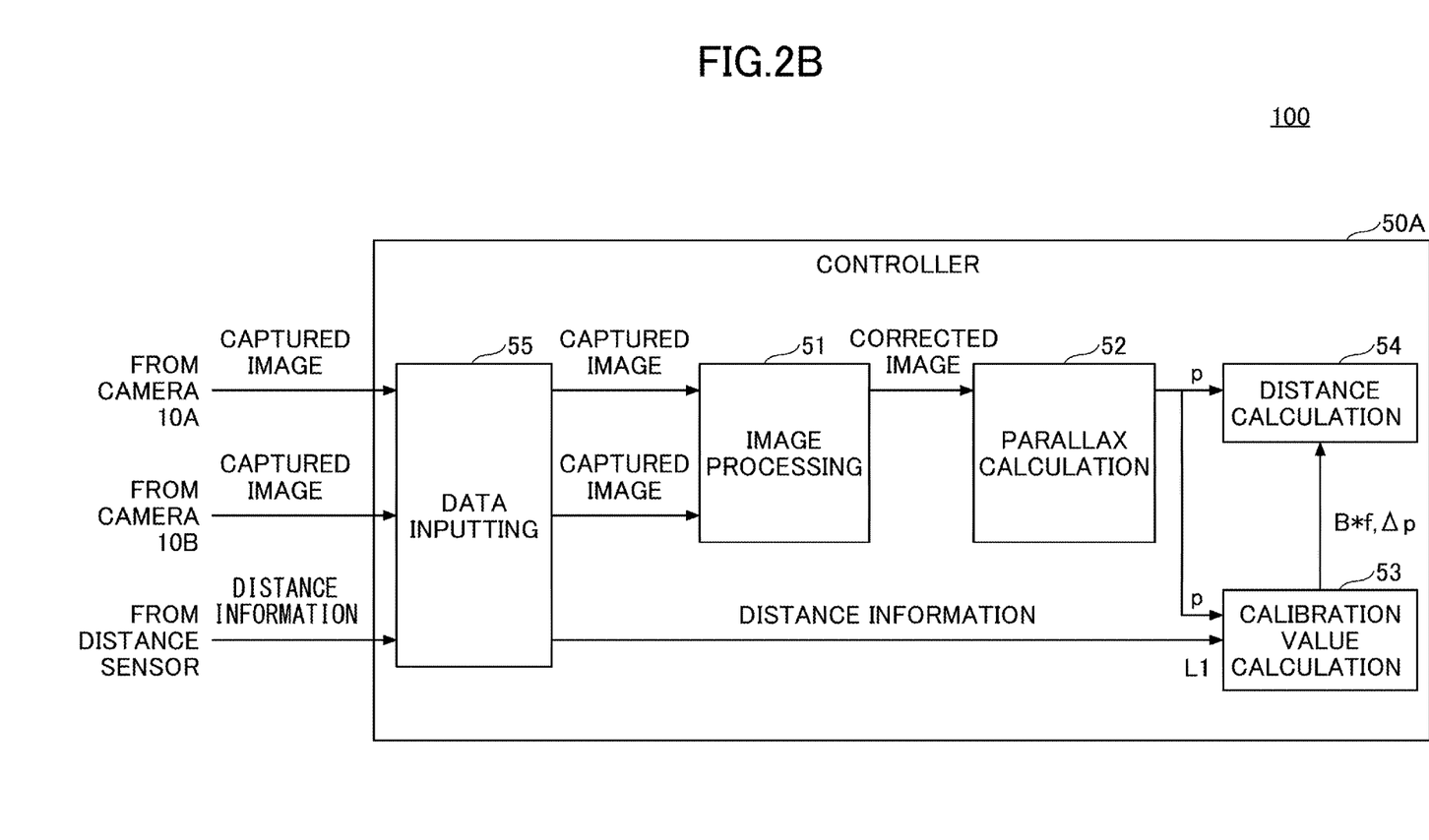
FIG. 2B is a functional block diagram of the integrated circuit shown in FIG. 2A.

FIG. 2B is a functional block diagram of the electronic circuit 50. The electronic circuit 50 may be implemented as a microprocessor composed of a large-scale integrated circuit (LSIC) or a logic device such as a field programmable gate array (FPGA). The electronic circuit 50 serves as a controller 50A, and has functional blocks including an image processing unit 51, a parallax calculation unit 52, a calibration value calculation unit 53, a distance calculation unit 54, and a data inputting unit 55.

The data inputting unit 55 receives the captured images data supplied from the cameras 10A and 10B, respectively, as well as the distance information supplied from the distance sensor 20. The captured image data are supplied from the data input unit 55 to the image processing unit 51. The distance information is supplied from the data input unit 55 to the calibration value calculation unit 53.

The image processing unit 51 performs image processing on the captured image, and generates a corrected image. The corrected image is then supplied to the parallax calculation unit 52, which then calculates a parallax "p" between the cameras 10A and 10B from the corrected image, by means of pattern matching or other appropriate methods. The parallax p is supplied to the distance calculation unit 54 and to the calibration value calculation unit 53.

The calibration value calculation unit 53 determines the distance Z from the optical center between the cameras 10A and 100B to the object to be measured, based on the distance information L to the object obtained by the distance sensor 20, and the known positional relationship between the distance sensor 20 and the cameras 10A and 10B. The calibration value calculation unit 53 calculates a B*f value and a parallax offset Δp using the calculated distance Z and the parallax p supplied from the parallax calculation unit 52, and supplies the B*f value and the parallax offset Δp to the distance calculation unit 54. The B*f value is a product of the actual distance (baseline length) B between the optical axes of the cameras 10A and 10B and the actual focal length f, as will be described in more detail later.

The distance calculation unit 54 uses the parallax p supplied from the parallax calculation unit 52 and the parallax offset Δp and B*f values supplied from the calibration value calculation unit 53 to determine the distance Z to the object to be measured, based on $$Z = B \times f / (p + \Delta p), \quad (1)$$

The calibration of the stereo camera device 100 may be carried out by product inspection before the stereo camera device 100 is shipped out of the factory, or it may be performed after the stereo camera device 100 has been installed in a vehicle, using a target to be measured.

<Principle of Distance Measurement>

Figure 3:
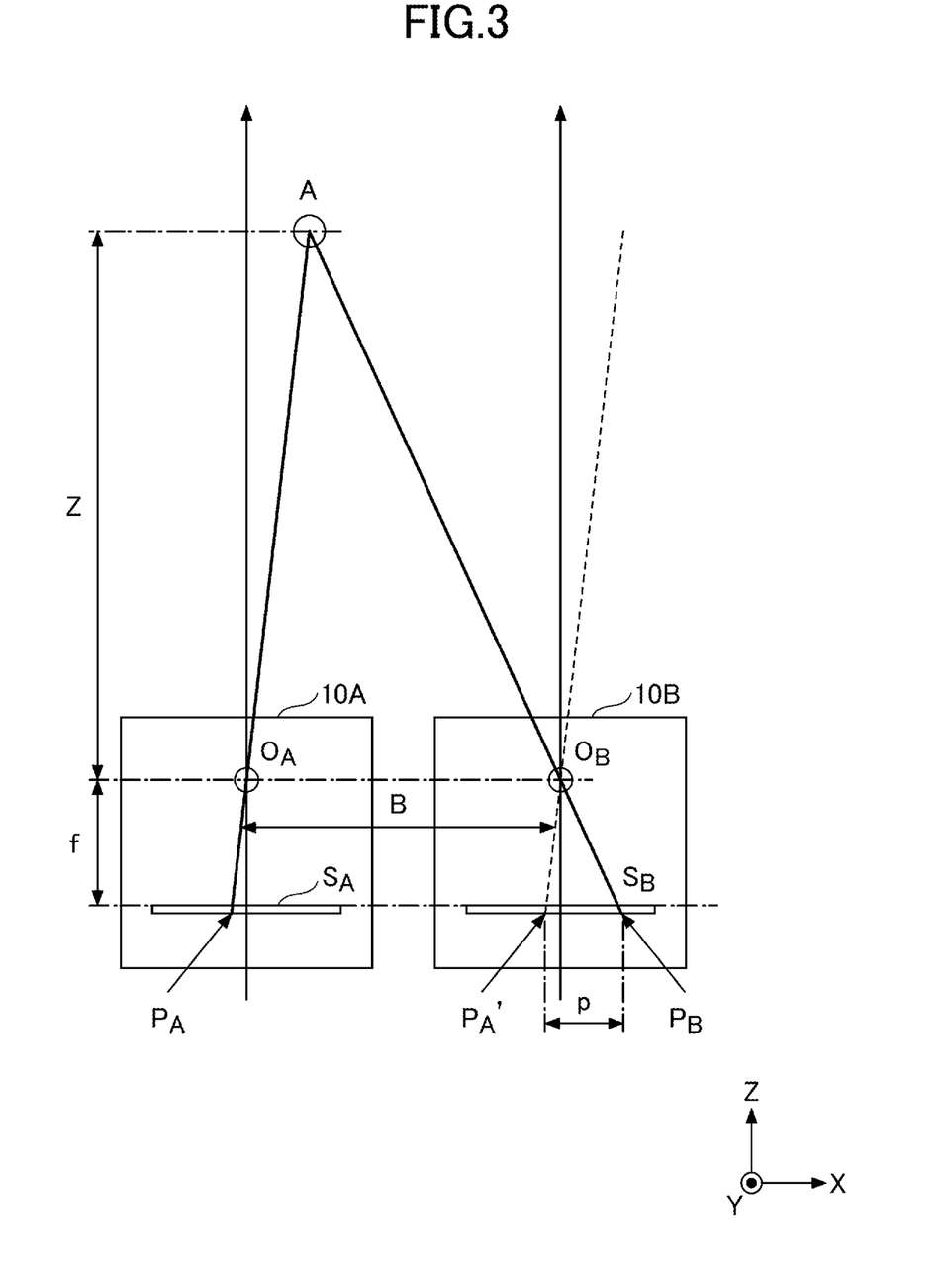
FIG. 3 shows the principle of distance measurement using the stereo camera device.

FIG. 3 illustrates the principle of distance measurement of the stereo camera device 100. The cameras 10A and 10B are set separated from each other at a distance B. The distance B is the distance between the optical axes of the cameras 10A and 10B, which is also called a baseline. The focal lengths of the cameras 10A and 10B are "f", the respective optical centers are $O_A$ and $O_B$, and the respective imaging planes are $s_A$ and $s_B$. What we want to find is the distance Z from the optical center of the cameras 10A and 10B to the object A to be measured.

The image of the object A located a distance Z away from the optical center $O_A$ in the optical axis direction (Z direction) is focused at $P_A$ which is the point of intersection of line A-$O_A$ with the imaging plane $s_A$. On the other hand, in the camera 10B, the same object A to be measured forms an image at position $P_B$ on the imaging plane $s_B$. The point of intersection of the line PL passing through the optical center $O_B$ of the camera 10B and parallel to the straight line A-$O_A$ with the imaging plane $s_B$ is labelled as $P_A'$. The distance between $P_A'$ and $P_B$ is the parallax p between the cameras 10A and 10B.

The point $P_A'$ represents the position of the image point $P_A$ with respect to the optical axis of the camera 10A. The parallax p is the total distance between $P_A'$ and $P_B$, which corresponds to the amount of misalignment of the images of the same object A to be measured taken by the two cameras 10A and 10B.

Triangle A-$O_A$-$O_B$ and triangle $O_B$-$P_A'$-$P_B$ are similar, so the relation $$Z = B \times f / p \quad (2)$$

is obtained. If the distance (i.e., the base line length) B between the optical axes of the cameras 10A and 10B and the focal length f are known, the distance Z can be determined from the parallax p. In reality, the baseline length B, the focal length f, and the parallax p vary slightly due to changes with time in the optical axis of the lens due to the influence of temperature change, vibration, or the like. Therefore, Z is determined from formula (1) using the parallax offset Δp as described above.

$$Z = B \times f/(p + \Delta p) \quad (1)$$

By measuring the distance Z to the object A from formula (1) at a plurality of positions, the actual values of B and f can be obtained by simultaneous equations.

<Calibration Process>

Figure 4:
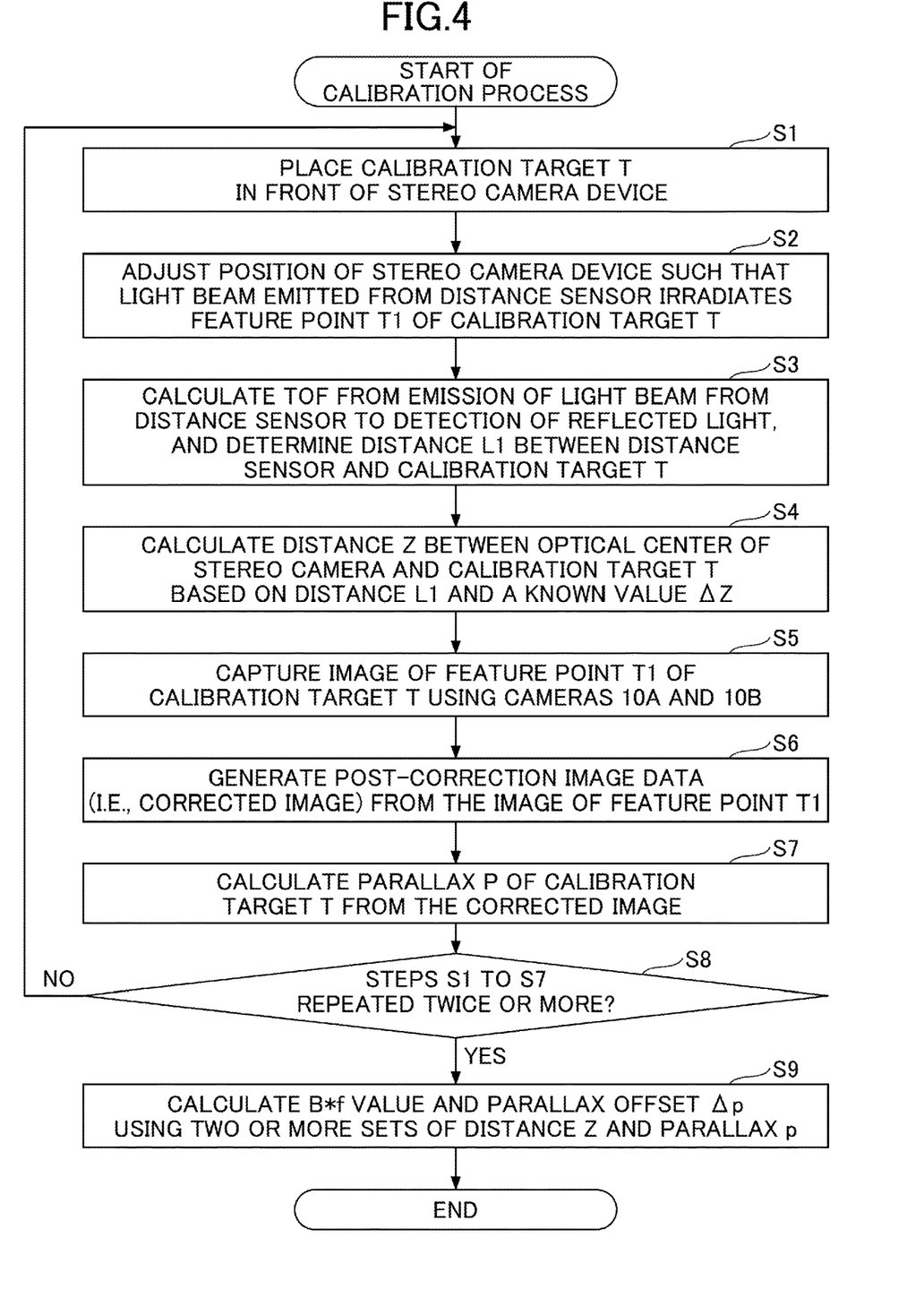
FIG. 4 is a flowchart of calibration of the stereo camera device.
Figure 5:
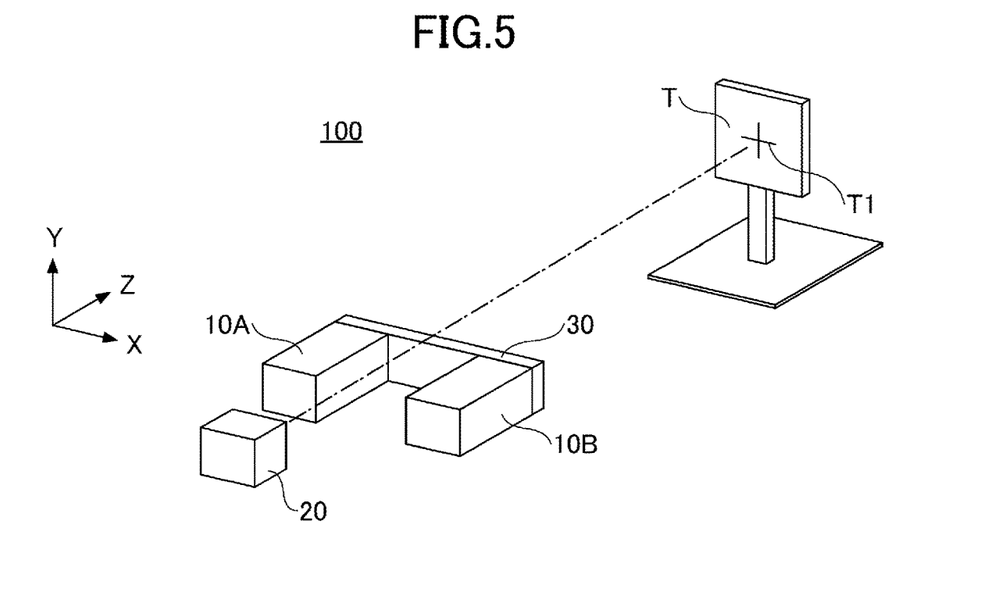
FIG. 5 shows a positional relationship between components at the time of calibration.

FIG. 4 is a flow chart of calibration, and FIG. 5 shows the positional relationship of components for calibration. In pre-shipment inspection, calibration may be performed using a calibration target T. In actual distance measurement, calibration may be performed using the object to be measured, as has been described above. In FIG. 5, the distance sensor 20 is illustrated behind (in −Z direction of) the cameras 10A and 10B for the purpose of explaining the calibration process; however, the distance sensor 20 may be integrally held together with the cameras 10A and 10B by the holder 30.

First, as illustrated in FIG. 5, a calibration target T is provided in front of the stereo camera device 100 in the measuring direction (+Z direction) (S1). Next, the stereo camera device 100 is placed at a predetermined position so that the light beam emitted from the distance sensor 20 irradiates the feature point T1 of the calibration target T (S2).

The distance sensor 20 has a light source that irradiates the calibration target T with a light beam, and a photodetector that detects the light reflected from the calibration target T. The light source may be a laser diode, and the photodetector may be a photodiode, for example. The optical axes of the light source and the photodetector are aligned in the same direction. The distance sensor 20 measures the time of flight (ToF), which is time taken from emission of the light beam from the light source to reception of the reflected light at the photodetector, and determines the distance L1 to the calibration target T based on the measured ToF (S3). The distance calculation unit 54 of the controller 50A calculates the distance Z between the optical center O of the camera and the calibration target T, based on the distance L1 determined by the distance sensor 20 and the known value ΔZ (S4). The known value ΔZ is the distance between the ranging origin of the distance sensor 20 and the optical center O of the cameras 10A and 10B. The known value ΔZ can be regarded as zero in the configuration of the embodiment, because the optical center O of the cameras 10A and 10B and the ranging origin of the distance sensor 20 fixed to the same holder 30 are located on substantially the same plane. If there is a difference in the Z-direction position between the optical center O of the cameras 10A and 10B and the ranging origin of the distance sensor 20 in the state fixed to the holder 30, the distance Z is determined using a non-zero value of ΔZ.

Meanwhile, the cameras 10A and 10B take a picture of the feature point T1 of the calibration target T (S5). The image of the feature point T1 is subjected to image processing at the image processing unit 51, and a corrected image (or corrected image data item) is generated (S6). The parallax calculation unit 52 calculates a parallax p with respect to the calibration target T from the corrected image (S7). Then, the Z-direction position of the calibration target T is changed, and steps S1 to S7 are repeated twice or more (YES in S8).

The calibration calculation unit 53 calculates an actual B*f value and a parallax offset Δp using two or more sets of the distance Z and the parallax p (S9). The actual B*f value and the parallax offset Δp are used as calibration data.

With application of the stereo camera device 100 to a vehicle at a construction site, the stereo camera device 100 detects obstacles or workers located in front of, beside, or behind the vehicle. Based on the relative speed or the relative position between the vehicle and the detected obstacle or worker, an alert or an automatic brake may be activated if there is a danger of collision. If the ranging accuracy is poor, automatic brake may be frequently activated and the work efficiency may fall. It is desirable for the automatic brake to be activated only when the danger of accidental contact with a person is high. To achieve this, a resolution distinguishable between workers and materials is required. In addition, it is necessary to maintain the distance ranging performance even in the outdoor environment with a large temperature difference and presence of dust or raindrops.

In the embodiment, the cameras 10A and 10B and the distance sensor 20 are fixed to a holder 30, instead of being fixed to the housing case 101, by means of a mechanical structure described below, thereby maintaining the positional accuracy between the cameras and the distance sensor as high as possible. Even if the positional relationship among the optical components changes with time due to a temperature change, vibration, and so on, the measurement accuracy of the stereo camera device 100 can be compensated for and ensured by the above-mentioned calibration function.

<Device Configuration>

Figure 6:
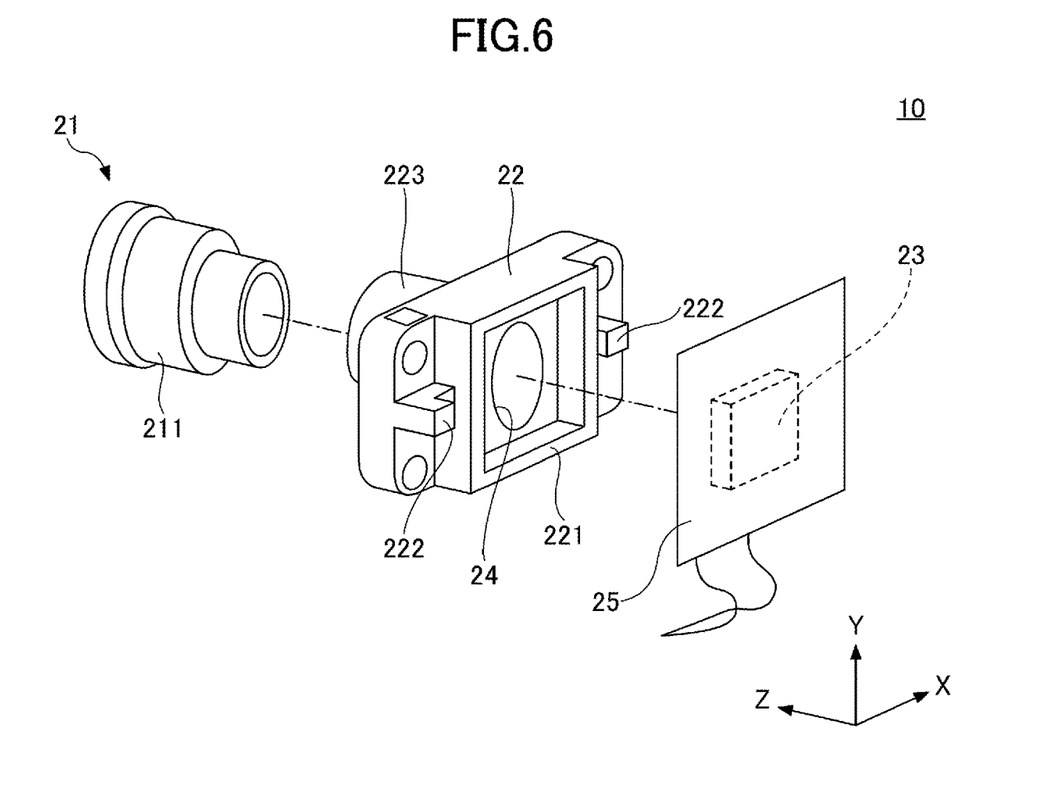
FIG. 6 is an exploded perspective view of a camera.

FIG. 6 is an exploded perspective view of the camera 10. The cameras 10A and 10B have the same configuration, and accordingly, these two cameras will be treated as one camera 10. The camera 10 includes a lens 21, and an image sensor 23 mounted on a printed circuit board 25. The lens 21 has a plurality of lens elements in a lens cell 211. The image sensor 23 is, for example, a CMOS sensor. The lens 21 and the printed circuit board 25 on which the image sensor 23 is mounted are incorporated in a base member 22 made of die-cast aluminum to form a monocular camera 10. A cylindrical screw hole 24 is formed in the base member 22 to receive the lens 21. The screw hole 24 is formed inside a cylinder 223 protruding in the Z direction from the base member 22, so as to be coaxial with the optical axis of the lens 21. The printed circuit board 25 is attached to mating surfaces 221 and 222 of the base member 22 so that the image sensor 23 is coaxial with the optical axis of the lens 21.

The mating surface 221 of the base member 22 encloses the surrounding of the image sensor 23, and two or more mating surfaces 222 are provided around the mating surface 221. As will be described later, the mating surfaces 222 are used to temporarily support the periphery of the printed circuit board 25 at two or more positions, and the printed circuit board 25 is eventually fixed to the mating surface 221. By providing the mating surfaces 222 at positions symmetrical with respect to the center axis of the image sensor 23, unbalanced tensile stress can be prevented from being generated on the printed circuit board 25 due to curing shrinkage of the adhesive used for the temporary support, whereby misalignment is prevented.

FIG. 7 is an exploded perspective view of the stereo camera device 100, FIG. 8A is a vertical cross-sectional view taken along the YZ plane of FIG. 1, and FIG. 8B is a horizontal cross-sectional view taken along the XZ plane of FIG. 1. As shown in FIG. 7 and FIG. 8B, the cameras 10A and 10B and the distance sensor 20 are fixed to the holder 30. The lens 21A of the camera 10A is fitted into the screw hole 24A of the base member 22A such that the optical axes of the lens 21A and the image sensor 23A mounted on the printed circuit board 25A align with each other. The cylinder 223 of the base member 22A is inserted into the fitting hole 13A of the holding 30 and appropriately positioned.

Similarly, the lens 21B of the camera 10B is fitted into the screw hole 24B of the base member 22B such that the optical axes of the lens 21B and the image sensor 23B mounted on the printed circuit board 25B align with each other. The cylinder 223 (see FIG. 6) of the base member 22B is inserted into the fitting hole 13B of the holder 30 and appropriately positioned.

The cameras 10A and 10B are fixed to the holder 30 through the fitting holes 13A and 13B so that the respective optical axes are parallel to each other. In the cameras 10A and 10B, the optical axes of the image sensor 23A and 23B mounted on the printed circuit boards 25A and 25B are aligned with respect to the lenses 21A and 21B, respectively, and the tilt angles rotating around the optical axes are defined. Therefore, even after the cameras 10A and 10B are fixed to the holder 30 with their optical axes parallel to each other, the optical posture and position determined in each camera 10 are maintained.

The distance sensor 20 is mounted on the printed circuit board 31. The distance sensor 20 is provided in substantially the middle of the cameras 10A and 10B so that the light beam input/output window is exposed in the opening 14 of the holder 30. The distance sensor 20 is attached to the holder 30 in a state where the optical axes of the light source and the photodetector align in the same direction. As a result, the cameras 10A and 10B and the distance sensor 20 are held by the holder 30 with their optical axes appropriately regulated.

As shown in FIG. 8A and FIG. 8B, each of the lenses 21A and 21B is configured with an assembly of a plurality of lens elements. The lenses 21A and 21B are screwed into the screw holes 24A and 24B, respectively, formed in the base members 22A and 22B, and secured so that the imaging planes of the image sensors 23A and 23B are in substantially the same plane.

The lenses 21A and 21B are, for example, retrofocus lenses, each with an assembly of a plurality of lens elements. The lens elements of each lens 21 are housed in the lens cell 211 with their axes, aligned. The lens cell 211 has a fitting part 62 for positioning the optical axis, a screw part 63 for allowing the lens 21 to be screwed in the optical axis direction under a predetermined axial force, and a locking part 64. In general, the focal length of a wide-angle lens such as a retrofocus lens is short, and the principal point 65 of the optical system as illustrated is offset toward the image sensor 23. Even with such a retrofocus configuration, it is desirable that the position of the principal point 65 does not fluctuate due to positional shift or postural change of the respective lens elements inside the screw hole 24.

In the embodiment, by providing the fitting part 62 at the end of the lens cell 211 so as to be the closest to the image sensor 23, the lens 21 is fixed in the vicinity of the principal point 65 of the optical system so that the parallelism of the respective lens elements with respect to the optical axis is maintained.

The screw part 63 engaged with the screw hole 24 is provided so as to be closer to the subject (or farther from the image sensor 23) than the fitting part 62, and the locking part 64 is provided even closer to the subject. When the lens 21 is screwed into the screw hole 24, the locking part 64 abuts against the base member 22 under a predetermined axial force, and the lens 21 can be appropriately positioned with respect to the image sensor 23. The axial force capable of withstanding vibration and impact is maintained even if expansion or contraction due to temperature changes, or the creep phenomenon due to aging occurs.

As the temperature rises, the lenses 21A and 21B move in a direction away from the image sensor sensors 23A and 23B due to thermal expansion, because the lenses 21A and 21B are restrained by the fitting parts 62A and 62B. On the other hand, the principal point 65 moves relative to the screw part 63 so as to be closer to the image sensor 23. As a result, the fluctuation in the distance between the principal point 65 and the image sensor 23 can be reduced, and the variation in the imaging characteristics due to the temperature change can be suppressed.

The printed circuit boards 25A and 25B on which the image sensors 23A and 23B are mounted are adjusted and aligned with respect to the lenses 21A and 21B fixed to the base members 22A and 22B, respectively, so that appropriate imaging characteristics can be achieved. In the alignment, six factors, namely, the position in the optical axis direction (or the Z direction), the coordinates in the XY plane orthogonal to the optical axis, the tilt component α around the x-axis, the tilt component β around the y-axis, and the tilt component γ around the z-axis are adjusted. Then, ultraviolet (UV) irradiation is performed on the UV curable adhesive filled in the gap between the mating surfaces 222 (see FIG. 6) of each of the base members 22A and 22B and the associated one of the printed circuit boards 25A and 25B, while maintaining the aligned positions and postures.

By this curing and adhesion, the aligned printed circuit boards 25A and 25B are temporarily adhered, so that the positions and postures of the imaging planes of the image sensors 23A and 23B are maintained with respect to the lenses 21A and 21B.

On the other hand, the mating surfaces 221 (see FIG. 6) of the base members 22A and 22B are coated with a thermosetting adhesive in advance. The cameras 10A and 10B, which have been subjected to the alignments including the temporary adhesion of the printed circuit boards 25A and 25B, are put into a heating furnace to cure the thermosetting adhesive. Owing to this treatment, the adhesive strength between the base members 22A and 22B and the printed circuit boards 25A and 25B is maintained even in a high temperature environment assuming that the base members 22A and 22B are left in a high temperature environment under the strong sun conditions.

In the embodiment, the UV curable adhesive is formed of an adhesive containing acrylic resin or urethane resin as a main component, which is relatively strong against impact and tension, and simultaneously has high flexibility. As the thermosetting adhesive, an adhesive containing epoxy resin as the main component, which has a high heat resistance, stiffness, and mechanical strength, is used. By furnishing two types of mating surfaces 221 and 222 to the base member 22 at different positions, and by using a highly flexible UV curable adhesive for the mating surfaces of the outer side, the printed circuit board 25 is prevented from coming off due to shear stress caused by the difference in coefficient of thermal expansion between the base member 22 and the printed circuit board 25.

It is preferable for the thermosetting adhesive to have an intramolecular cohesion, namely, a Young's elastic modulus equal to or higher than that of the UV-curable adhesive. The UV curable adhesive and the thermosetting adhesive may contain the same main ingredient. For example, epoxy resin may be used as the main component, and a curing accelerator may be selectively blended so that the adhesive serves as either a UV curable adhesive or thermosetting adhesive, depending on the process requirements.

Generally, a UV curable adhesive hardens in a short time under UV irradiation, and is efficient from the viewpoint of reducing the takt time of the assembly process; however, the heat resistance may be insufficient. On the other hand, the thermosetting adhesive has a high heat resistance, but it takes a long time (1 hour or more) to completely harden and is difficult to introduce in the alignment process.

Therefore, in the embodiment, the process is designed so that after the alignment has been adjusted, temporary adhesion is first performed using a UV curable adhesive, and then a batch process for curing the thermosetting adhesive is performed by putting a plurality of semi-finished products having been adjusted into a heating furnace. Consequently, even if the mating surface 222 of the base member 22 is located in a site where the energy of the UV irradiation does not reach easily, the final adhesive force is secured.

Further, as shown in FIG. 6, the mating surface 221 of the base member 22 surrounds the periphery of the image sensor 23, and the printed circuit board 25 and the mating surface 221 are tightly bonded with a thermosetting adhesive, thereby preventing dust or water droplets from entering the inside of the camera 10.

Although a UV curable adhesive and a thermosetting adhesive are used in combination in the above-described example in order to shorten the takt time, the process is not limited to this example. For example, a thermosetting adhesive may be temporarily cured by applying hot air for a short time so as to keep the alignment, and then a batch process may be performed in a heating furnace to completely cure. This alternative is also effective with little influence on the takt time, and renders the process not requiring a UV curable adhesive.

Any types of adhesive, other than UV curable type and thermosetting type, may be used as long as a short-time temporal curing process is provided prior to the complete curing in order to ensure the mechanical strength and reliability of the bonding.

After the cameras 10A and 10B are individually aligned and adjusted, and after the thermosetting adhesive is completely cured, monocular inspection is performed on the respective camera, and then the cameras are fixed to the holder 30. The cylinders 223 of the base members 22A and 22B, formed coaxially with the optical axes of the lenses 21A and 21B, are inserted into the fitting holes 13A and 13B of the holder 30, and the outer surfaces of the base members 22A and 22B are brought into contact with the stopper 20 (see FIG. 7) in the rotational direction, whereby the position and posture around the optical axis are determined.

The front surfaces of the base members 22A and 22B are abutted against the contact surface 30a of the holder 30 in the XY plane orthogonal to the optical axis of the lenses 21A and 21B, and the cameras 10A and 10B are fixed to the holder 30 by screwing. The contact surface 30a serves as positioning means common to the cameras 10A and 10B. The position of the printed circuit board 25 with respect to the base member 22 can also be adjusted with reference to the contact surface 30a.

In the above-described embodiment, the cameras 10A and 10B are individually assembled to the base members 22A and 22B, and then fixed to the holder 30. Alternatively, the screw holes 24 and the mating surfaces 221 and 222 may be provided to the holder 30 so that the lenses 21A and 21B and the printed circuit boards 25A and 25B are directly assembled into the holder 30, without using the base members 22A and 22B.

Openings 16 for camera and an opening 17 for distant measurement are formed in the front wall of the upper case 15 of the housing case 101. An opening 43 is formed on the rear wall of the lower case 40 so as to receive a cable wirings unit 400 (see FIG. 8A) which serves as an external interface. The upper case 15 and the lower case 40 have joint surfaces (or split surfaces) 42 inclined obliquely with respect to the XZ plane (see FIG. 1) so that the functions are separated between the front side and the rear side of the housing case 101. The upper case 15 and the lower case 40 are connected to each other in flat contact at the joint surfaces 42.

Each of the upper case 15 and the lower case 40 has a shape of a triangular prism shell. The upper case 15 provides the front wall and the top of the housing case 101, and the lower case 40 provides the rear wall and the bottom of the housing case 101. The side shape of the upper case 15 is a triangle whose hypotenuse is downward, and the side shape of the lower case 40 is a triangle whose hypotenuse is upward. By coupling the upper case 15 and the lower case 40 at the joint surfaces 42 inclined obliquely with respect to a plane parallel to the upper face of the upper case 15 or the bottom of the lower case 40, a rectangular housing case 101 is assembled. Because the upper case 15 and the lower case 40 are formed into the shape of a triangular prism shell obtained by diagonally cutting a rectangular parallelepiped case, the number of split surfaces can be reduced and the waterproof effect can be enhanced. In addition, the housing case 101 can be fabricated and assembled easily.

The upper case 15 and the lower case 40 may be connected to each other with a sheet-like silicon rubber sealing member 44 inserted between the joint surfaces 42, thereby preventing dust or water droplets from entering the inside of the stereo camera device 100. In the embodiment, in order to suppress heat conduction between the upper case 15 and the lower case 40, the sealing member 44 is used so as to avoid direct contact between the upper case 15 and the lower case 40, but the configuration is not limited to this example. A typical sealing structure, such as forming a groove in one of the upper case 15 and the lower case 40 and providing a packing, may be employed.

The cameras 10A and 10B and the distance sensor 20 are provided in the upper case 15. For example, the holder 30 that holds the cameras 10A and 10B and the distance sensor 20 may be screwed to the inner surface of the front wall of the upper case 15, which is parallel to the XY plane orthogonal to the optical axis. The holding member 30 can be attached to and detached from the upper case 15 while maintaining the optical positional relationship between the cameras 10A and 10B and the distance sensor 20. Accordingly, it is unnecessary to readjust the positions or postures of the respective optical components individually, when the cameras 10A and 10B and the distance sensor 20 are set in the housing case 101, and the distance ranging performance can be ensured.

Even if an impact is externally applied to the housing case 101, a change in the positional relationship or the relative posture between the cameras 10A and 10B and the distance sensor 20 can be suppressed by providing a holder 30 separately from the upper case 15. The openings 16A and 16B for camera and the opening 17 for distance measurement provided in the upper case 15 may be formed in a diffusible (or jagged) shape in order to prevent internal reflection, or they may be coated with a matte black coating to avoid strong sunlight or suppress detection failure due to ambient light.

A cover glass 102 is attached to the front surface of the upper case 15 to cover the openings 16A and 16B for camera and the opening 17 for the distance sensor. The periphery of the cover glass 102 may be sealed with a sealing material. The cover glass 18 is composed of a single glass plate, as has been described above. Even if the cameras 10A and 10B and the distance sensor 20 are collectively set in or removed from the case, variation in distortion (or bulge aberration) or deviations from the focusing position, which may occur in each camera 10 due to the fluctuation in thickness or warp of the cover glass 18, can be suppressed.

The printed circuit board 41 to which the electronic circuit 50 is attached is provided in the lower case 40. For example, the printed circuit board 41 on which the electronic circuit 50 is mounted is provided to the inner surface of the bottom of the lower case 40. The lower case 40 can be detached from the upper case 15 to connect the electronic circuit to the cable wiring 400 or carry out maintenance of the device.

The printed circuit boards 25A, 25B and 31 held in the upper case 15 may be connected to the printed circuit boards 41 held in the lower case 40 by flexible printed circuit (FPC) cable 48 when the upper case 15 and the lower case 40 are combined together. The FPC cable 48 may be folded and housed in the housing case 101.

The cable wiring 400, which serves as an external interface, includes a relay connector 45, a waterproof packing 46, and a locknut 47. The cable wiring 400 is attached by inserting the screw of the relay connector 45 in the opening 43 formed in the rear wall of the lower case 40 from the outside, with the waterproof packing 46 between the opening 43 and the relay connector 45, and by tightening the locknut 47 from the inside. This configuration of the cable wiring 400 can prevent water, oil, dust and so from entering the stereo camera device 100.

In order to improve the detection resolution, it is necessary to increase the number of pixels of the image sensor. As the number of pixels of the imaging device increases, the amount of electronic data processing inevitably increases, and the heat generated by the electronic circuit 50 also increases.

In the embodiment, a heat dissipation path is provided in the lower case 40 to release the heat generated in the printed circuit board 4,1 on which the electronic circuit 50 such as an LSIC, FPGA, or the like is mounted, from the lower case 40 to the outside. Further, the printed circuit board 25 with the image sensor 23 mounted thereon is bonded to the base member 22 using a thermosetting or UV curable adhesive having a low heat transfer rate, as has been described above. Accordingly, the heat generated by the printed circuit board 25 is transferred to the printed circuit board 41 mainly through the FPC cable 48. For example, the grounding pattern of the FPC cable 48 and the printed circuit board 41 may be a formed as a solid wiring layer, and stacked so as to efficiently transfer heat to the lower case 40.

The electronic circuit 50 mounted on the printed circuit board 41 may be brought into close contact with the lower case 40 by thermal paste. Thermal paste is a resin paste formed of silicone oil in which powders, such as alumina powder, having good thermal conductivity are mixed. By applying thermal paste to the base surface formed on the lower case 40 and incorporating the printed circuit board 41 onto the lower case 40, the electronic circuit 50 is brought into close contact with the lower case 40.

The area size of the base of the lower case 40 to which the thermal paste is applied is determined based on the amount of heat generation or power consumption of the heat sources, such as an LSI or FPGA, and the thermal resistance of the thermal paste. A sheet-like silicone pad or the like may be used instead of the thermal paste. In the embodiment, a heat transfer paste, which flexibly spreads and settles in the gap between the printed circuit board 41 and the base surface in an uncured state when the printed circuit board 41 is incorporated, is used so as to prevent overloading onto the printed circuit board 41 due to a pressing force.

A radiation fin 401 may be formed on the outer surface of the lower case 40 to increase the surface area. Surface treatment such as black coating may be provided to the outer surfaces of the radiation fins 401 and the lower case 40 to further improve the heat dissipation. A thermal circuit is formed by natural convection such that the heat transferred to the lower case 40 is efficiently released to the outside air so as not to store the heat inside.

In this manner, the optical system including the cameras is consolidated in the upper case 15, while the electronic circuit 50 is provided in the lower case 40, and the imaging function and the computing function are separated. By combining the upper case 15 and the lower case 40 with the sealing member 44 whose thermal resistance is higher than that of the upper case 15 and the lower case 40, provided between them, the heat generated in the printed circuit board 41 on which the electronic circuit 50 is mounted is released from the lower case 40. The sealing member 44 having a low thermal resistance serves as a buffer material, and heat transfer from the lower case 40 to the upper case 15 can be suppressed. With this structure, undesirable influence of heat on the base members 22A and 22B holding the lenses 21A and 21B is minimized, and the positions and postures of the lenses 21A and 21B are stably maintained over a long time.

The stereo camera device 100 can be directly mounted on, for example, a frame configuring a head guard of a forklift or a hydraulic excavator. Attaching parts 49 may be provided to the upper case 15 to mount the stereo camera device 100 to a vehicle, as illustrated in FIG. 7. By optically adjusting the field of view when the stereo camera device 100 is mounted on the vehicle, the distance measurement accuracy of the cameras 10A and 10B can be maintained.

In mounting the stereo camera device 100 on a forklift or hydraulic excavator, it is necessary to estimate not only the contact distance between the vehicle and the object, but also the contact distance between the edges of the cargo and the object. For a system in which stereo camera devices 100 are provided on the front side and the rear side respectively to enable 360-degree detection corresponding to rotational operation, it is necessary to ensure continuity of the field of view. Therefore, it is desirable that the object identification function is tunable according to the situation at the site, in mounting the stereo camera device 100 onto the vehicle. When a component needs to be replaced due to updating of the object identification function, malfunction of the electronic circuit 50, deterioration of the seal member 44 over time, etc., the lower case 40 is detached, while the upper case 15 accommodating the cameras 10A and 10B is fixed to the vehicle, to perform maintenance work. The stereo camera device 100 has a configuration suitable for being mounted on a vehicle, and is capable of maintaining the distance measurement performance. The stereo camera device 100 can be mounted not only onto vehicles, but also onto flying objects such as drones and moving bodies such as ships.

Because the cameras 10A and 10B and the distance sensor 20 are integrally held by the holder member 30 independently from the housing case 101, the positional relationship between the cameras 10A and 10B and the distance 20 is accurately maintained. If optical devices such as cameras 10A and 10B or the distance sensor 20 are directly attached to the housing case 101, the influence of vibration and heat on the optical system becomes significant. In contrast, with the configuration of the embodiment, the environmental influence on the imaging system is minimized, and the distance ranging accuracy can be maintained. By accommodating the holder 30 in the upper case 15, the positional relationship between the vehicle and the image pickup system including the cameras 10A and 10B and the distance sensor 20 is maintained even if the lower case 40 is removed. The distance sensor 20 and the cameras 10A and 10B do not have to be integrally fixed to the holder 30 as long as the distance sensor 20 and the cameras 10A and 10B are maintained in a predetermined positional relationship. For example, the distance sensor 20 and the cameras 10A and 10B may be attached to separate holders, and such holders may be combined or coupled so that the positional relationship between the distance sensor 20 and the cameras 10A and 10B is maintained.

In the stereo camera device 100, deterioration of distance measurement performance is suppressed even in an outdoor environment. When the stereo camera device 100 is mounted on a moving body such as a vehicle, a drone, or a ship, the distance is calculated from the parallax, regardless of the speed or direction of the moving object, and detection of an object and distance estimation can be performed accurately in a short range. Further, using a retrofocus lens, a worker and a cargo or material can be distinguished from each other in a wide-angle near-field of view with a viewing angle of 120° or wider.

What is claimed is:

1. A stereo camera device comprising:
    a plurality of cameras;
    a distance sensor configured to detect a distance to an object;
    a holder configured to integrally hold the plurality of cameras and the distance sensor so that an optical axis of the distance sensor and optical axes of the plurality of cameras are in a same direction;
    an electronic circuit; and
    a case in which the plurality of cameras and the distance sensor integrally held by the holder, and the electronic circuit are provided,
    wherein the holder is provided separately from the case, the case having first openings for the plurality of cameras and a second opening for the distance sensor, the first openings and the second opening being sealed with a cover glass,
    wherein the case includes a first case and a second case, the first case having an attaching part to be attached onto a vehicle or a moving body, the first openings, and the second opening,
    wherein the first case is configured to accommodate the plurality of cameras and the distance sensor integrally held by the holder, the second case is configured to accommodate the electronic circuit, the first case and the second case being combined to form the case, and
    wherein the holder is brought into contact with an inner surface of a front wall of the first case so that the plurality of cameras and the distance sensor are fit into the first openings and the second opening, respectively, and sealed together with the cover glass.

2. The stereo camera device as claimed in claim 1, wherein the plurality of cameras and the distance sensor held by the holder are attachable to and detachable from the case.

3. The stereo camera device as claimed in claim 1, wherein the holder is attached to the first case in a detachable manner.

4. The stereo camera device as claimed in claim 1, wherein the second case is detachable from the first case, while the first case is mounted on the vehicle or the moving body.

5. The stereo camera device as claimed in claim 1, wherein, in each of the plurality of cameras, an optical axis of an optical component included in each camera and a tilt angle around the optical axis are adjusted.

6. The stereo camera device as claimed in claim 1, wherein the distance sensor has a light source and a photodetector, the distance sensor being held by the holder so that optical axes of the light source and the photodetector align with each other.

7. The stereo camera device as claimed in claim 1, wherein an optical center of the plurality of cameras and a ranging origin of the distance sensor are positioned within a plane perpendicular to the optical axes of the plurality of cameras.

8. The stereo camera device as claimed in claim 1, wherein the electronic circuit calculates a distance to the object based on image data captured by the plurality of cameras and corrects a calculated distance based on distance information acquired by the distance sensor held integrally with the plurality of cameras.

* * * * *